United States Patent [19]

Takahashi

[11] Patent Number: 5,063,558
[45] Date of Patent: Nov. 5, 1991

[54] DISK CARTRIDGE

[75] Inventor: Kenji Takahashi, Miyagi, Japan

[73] Assignee: Sony Corporation, Tokyo, Japan

[21] Appl. No.: 530,317

[22] Filed: May 30, 1990

[30] Foreign Application Priority Data

Jun. 5, 1989 [JP] Japan .................................. 1-142562

[51] Int. Cl.⁵ ........................ G11B 23/02; G11B 23/03
[52] U.S. Cl. .................................... 369/291; 369/77.2;
360/133
[58] Field of Search ................ 369/291, 77.2; 360/133

[56] References Cited

U.S. PATENT DOCUMENTS

| 4,550,354 | 10/1985 | Wakabayashi et al. | 360/133 |
| 4,589,105 | 5/1986 | Nemoto et al. | 369/291 |
| 4,785,369 | 11/1988 | Ommori et al. | 360/133 |
| 4,853,817 | 8/1989 | Mizuta et al. | 369/291 |
| 4,858,050 | 8/1989 | Ashe et al. | 369/291 |
| 4,908,726 | 3/1990 | Kato | 369/291 |

FOREIGN PATENT DOCUMENTS

59-177073 11/1984 Japan .

Primary Examiner—Stuart S. Levy
Assistant Examiner—Tan Nguyen
Attorney, Agent, or Firm—Alvin Sinderbrand; William S. Frommer

[57] ABSTRACT

In a disk cartridge which includes a cartridge body having a record disk rotatable therein, openings in the cartridge body through which a signal recording area and a chucking area of the record disk may be exposed, a shutter slidably mounted on the cartridge body for movement across the front of the latter between opened and closed positions in which the cartridge body openings are uncovered and covered, respectively, and a torsion spring having a resilient coil from which angularly movable first and second arms extend to bent ends acting against the cartridge body and the shutter, respectively, for biasing the shutter to its closed position; the cartridge body has a slot-like opening extending along its front from a corner of the body at which the bent end of the first spring arm is engageable through such slot-like opening with a respective retainer in the body, opening the torsion spring is bodily inserted into a relatively wide portion of the slot-like opening with the spring arms flexed toward each other and then the spring arms are released to move resiliently apart for engaging the bent end of the second spring arm with a retainer extending from the shutter into the slot-like opening, and extending along a slot-like opening from the relatively wide portion thereof are an outer rib reaching presenting an outer face slidably engageable by the bent end of the second spring arm, and an inner rib spaced inwardly from the outer rib to clear a shutter retainer on the shutter engageable by the bent end of the second spring arm and having an edge surface higher than the outer rib and slidably engageable by the second spring arm for preventing disengagement of the bent end of the second spring arm from the outer face of the outer rib.

5 Claims, 12 Drawing Sheets

DISK CARTRIDGE

FIELD OF THE INVENTION

This invention relates to a disk cartridge accommodating a disk-shaped recording medium such as an optical disk or a magneto-optical disk.

DESCRIPTION OF THE PRIOR ART

A disk cartridge is comprised of a disk-shaped recording medium, such as an optical disk or a magneto-optical disk, rotatably accommodated in a cartridge body which is made up of an upper half and a lower half abutted and connected to each other. This disk cartridge is mounted in a cartridge mounting section of a recording/reproducing apparatus, with the disk-shaped recording medium remaining in the cartridge body, for reading or writing predetermined data from or on the recording medium.

The cartridge body accommodating the disk-shaped recording medium has signal writing and reading openings through which signal writing and reading means, such as an optical pickup unit, can have access to the signal recording surface of the disk-shaped recording medium, and a central opening by means of which a disk table for rotatably driving the disk-shaped recording medium may be introduced into the cartridge body.

If the signal writing and reading openings remain open when the cartridge is not in use, dust and dirt may enter the cartridge body therethrough or through the central opening during storage or other non-use time when the disk cartridge is not mounted in position in the recording/reproducing apparatus, and such dust and dirt may adhere to the signal recording surface. With the contaminations or dust and dirt thus affixed to the signal recording surface of the disk-shaped recording medium, data signal dropout may be caused during data signal writing or reading, or data signal writing or reading may become unfeasible.

In order to prevent such situation from occurring, a shutter is mounted on the cartridge body for closing the signal writing and reading openings and the central opening during times when the disk cartridge is not in use or mounted in position within the recording/reproducing apparatus, and for opening or uncovering the openings when the disk cartridge is mounted in position in the recording/reproducing apparatus. In other words, the shutter is mounted on the cartridge body so as to be movable between a position for closing the signal recording and reading opening and the central opening and a position for uncovering these openings.

During the time when the disk cartridge is not mounted in position within the recording/reproducing apparatus, the shutter is biased by a torsion coil spring for perpetually closing the signal writing and reading openings. The torsion coil spring is mounted within the cartridge body with the end of one arm section extended from its coil section being held by a retainer in the cartridge body and with the end of the other arm section extended from the coil section being held by a retainer formed in the shutter. The torsion coil spring biases the shutter in the direction of closing the shutter.

The torsion coil spring is introduced into the cartridge body after the shutter is mounted in position on the cartridge body. The torsion coil spring is inserted into the cartridge body through an insertion opening which is formed in the front side of the cartridge body mounting the shutter.

For introducing the torsion coil spring into the cartridge body, after the end of its one arm section is held by a retainer in the cartridge body, the other arm section is thrust manually for opening or spreading the arm sections apart from each other. The torsion coil spring is introduced in this state into the cartridge body. After the spring is introduced into the cartridge body, the other arm section is released from the manual thrusting being applied thereto, so that the other arm section is free to be shifted towards the shutter by the resilient restoring force of the torsion coil spring, until the end of the other arm section is retained or engaged by the retainer formed in the shutter.

In this manner, the shutter is biased in the direction for closing the signal writing and reading openings and the central opening, by having the ends of the arm sections of the torsion coil spring respectively retained by the shutter and by the retainer in the cartridge body.

A disk cartridge has also been proposed in which a shutter adapted for opening and closing openings in the cartridge body is biased by a torsion coil spring in the direction for opening or uncovering the openings, for example, as disclosed in the U.S. Pat. No. 4,550,354 and the corresponding Japanese Patent Publication No. 62-2381(1986). In this case, the torsion coil spring is introduced into the cartridge body with its arm sections flexed manually in the direction to be close to one another. When the manually flexed torsion coil spring is introduced to a predetermined position within the cartridge body, the arm section intended to act on the shutter is freed of manual thrusting so that such arm section is shifted under the resilient restoring force of the torsion coil spring until it is retained by the retainer provided in the shutter.

For accurately engaging an arm section with the retainer provided in the shutter, it is necessary to accurately control the insertion angle of the torsion coil spring into the cartridge body and the position at which the manual thrusting on such arm section is released.

However, since the torsion coil spring is introduced into the cartridge main body in a resiliently flexed state, it becomes difficult to accurately control the insertion angle, while the position at which the manual thrusting action is released cannot be controlled accurately. As a result, it is extremely difficult to positively engage an arm section of the torsion coil spring with the retainer provided in the shutter.

A disk cartridge in which the insertion of the torsion coil spring into the cartridge main body is facilitated and the arm sections of the torsion coil spring may be positively held by the retainers of the cartridge main body and the shutter, is disclosed in the Japanese Utility Model Publication 59-177073(1984).

It is to be noted that, in a disk cartridge accommodating a disk-shaped recording medium having its substrate formed of synthetic resin or glass exhibiting a predetermined toughness, the cartridge body has an increased thickness. As a result, the space in the cartridge body in which to store the torsion coil spring is greater in height than the coil section of the torsion coil spring, so that it becomes more and more difficult to accurate control the position of the torsion coil spring. If the inserting position of the torsion coil spring cannot be controlled correctly, the arm sections of the torsion coil spring cannot be retained positively by the retainer of the cartridge body, and the retainer in the shutter, so that the shutter cannot be biased to move in the direction for opening or closing the openings.

OBJECTS AND SUMMARY OF THE INVENTION

It is therefore an object of the present invention to provide a disk cartridge, as aforesaid, in which the movement of the arm section of the torsion coil spring under the resilient restorative force of the coil spring section may be accurately controlled in the directions along the height and along the major surface of the cartridge body to assure positive engagement of the arm section with the retainer provided in the shutter.

It is another object of the present invention to provide a disk cartridge in which the torsion coil spring can be mounted easily and positively either by a manual operation or with the aid of an automatic mounting system.

In accordance with the present invention, in a disk cartridge comprising a cartridge body having a disk-shaped recording medium rotatably accommodated therein and having an opening for exposing at least a portion of a signal recording area of said disk-shaped recording medium, a shutter movably mounted on said cartridge body for opening or closing said opening, and a torsion coil spring mounted in said cartridge body with one arm section thereof retained at a portion of said cartridge body and with the other arm section thereof retained at a portion of said shutter, so that said torsion coil spring biases said shutter in the direction for closing said opening; an insertion opening for said torsion coil spring is provided at the front side of said cartridge body mounting said shutter, and movement control means are provided for controlling the direction of flexural movement of said other arm section during the flexural movement of said other arm section into engagement with said portion of said shutter.

With the above described disk cartridge, after the torsion coil spring, with its arm sections resiliently flexed in the direction of being opened one from the other is introduced into the cartridge body through the insertion opening therein, the manual thrusting on the arm section adapted for engagement with the shutter is released, whereby the latter arm section is freed for movement in the direction of engaging with the shutter. At this time, the movement of the arm section in the direction along the height and the major surface of the cartridge body is controlled by the movement controlling means. Further, with an arm section engaging with the shutter, the shutter is biased by the torsion coil spring for closing the openings of the cassette body in which the disk-shaped recording medium is rotatably accommodated and through which the signal recording area of the disk-shaped recording medium may be exposed to the outside upon opening of the shutter.

DETAILED DESCRIPTION OF PREFERRED EMBODIMENTS

In the presently described embodiment, the invention is applied to a disk cartridge containing a magneto-optical disk as a disk-shaped recording medium.

Figure 1:
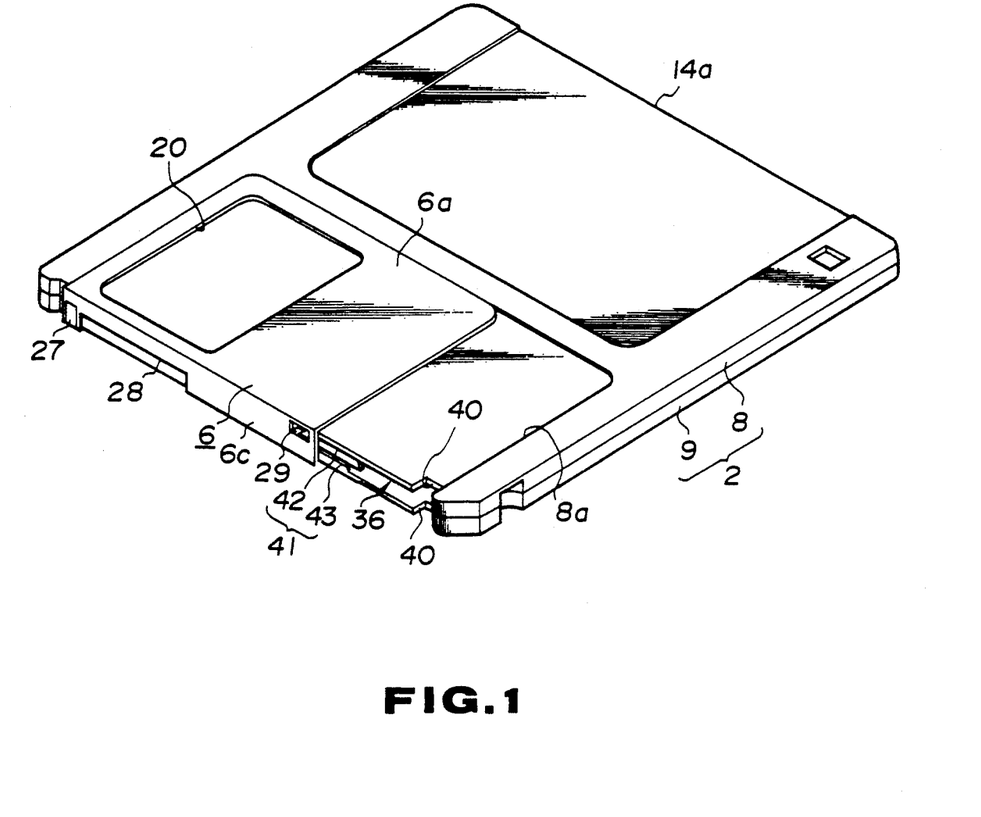
FIG. 1 is an overall perspective view of a disk cartridge according to the present invention.
Figure 2:
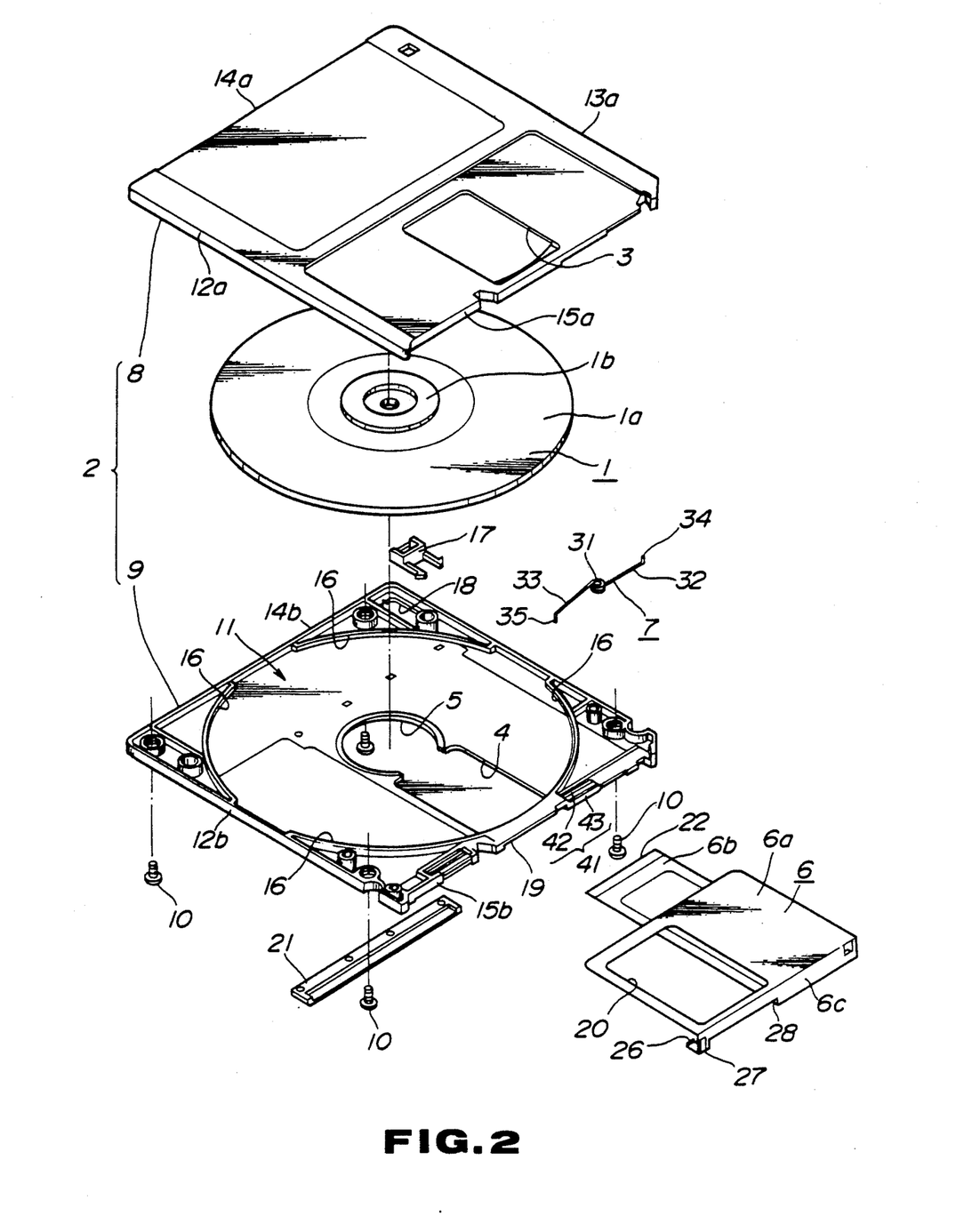
FIG. 2 is an exploded perspective view of the disk cartridge shown in FIG. 1.

Referring to FIGS. 1 and 2, the disk cartridge according to the present invention is shown to include, as its main components, a disk-shaped magneto-optical disk 1, a cartridge body 2 rotatably accommodating the magneto-optical disk 1, a shutter 6 movably mounted on the cartridge body 2 and adapted for closing data signal writing and reading openings 3, 4 provided in the cartridge body 2 for exposing to the outside a signal recording area 1a of the disk 1 and a central opening 5 through which a center hub 1b at the center of the disk is exposed to the outside for engagement by a disk table of a disk driving device (not shown), and a torsion coil spring 7 which is provided within the cartridge body 2 and which operates to bias the shutter 6 in a direction for closing the openings 3, 4 and 5.

The magneto-optical disk 1 includes a disk base plate or substrate which exhibits a substantial stiffness and is formed of polycarbonate resin or glass and on the major surface of which a signal recording layer 1a is formed. The disk 1 has a substantial thickness as compared with that of a magnetic sheet disk.

Referring to FIG. 2, the cartridge body 2 accommodating the magneto-optical disk 1 is shown to be composed of an upper half 8 and a lower half 9, each in the form of a substantially rectangular flat plate, and which are abutted to each other and interconnected by a plurality of set screws 10. This cartridge body 2 is of a sufficient thickness to form a disk containing cavity or section 11 therein which is of sufficient to rotatably accommodate the magneto-optical disk 1 of relatively large thickness. To this end, there are formed, on the outer peripheral sides of the upper and lower halves 8, 9 making up the cartridge body 2, side wall sections 12a, 12b, 13a, 13b constituting left and right side walls 12 and 13 of the cartridge body 2, rear side wall sections 14a, 14b constituting a rear wall 14 of the cartridge body 2, and front side wall sections 15a, 15b constituting a front wall 15 of the cartridge body 2. Within the interior of the cartridge body 2, there is formed the disk containing section 11 delimited by an arcuate peripheral wall for safeguarding the magneto-optical disk 1 in the cartridge body 2 against possible contact with the torsion coil spring 7 in the cartridge body 2 and also for assuring smooth rotation of the disk 1. In order to form such arcuate peripheral wall, arcuate upstanding wall sections 16 are formed at registering positions on the inner surfaces of the upper and lower halves 8 and 9 of the cartridge main body 2, so that, when the upper and lower halves 8 and 9 are abutted against each other, the wall sections 16 also abut to complete the above mentioned peripheral wall around the disk containing section 11.

At one corner of the rear wall 14 of the cartridge body 2 is mounted an inadvertent recording inhibit member 17 adapted for determining whether or not data signals can be written on the magneto-optical disk 1. More specifically, the inadvertent recording inhibit member 17 is movably mounted with a portion of the cartridge body 2 facing an inadvertent recording inhibit detection opening 18 formed at a corner on the rear side wall section 14b of the lower half 9.

The data signal writing and reading openings 3, 4 are formed in the upper and lower sides of the cartridge body 2, respectively. That is, the data signal writing and reading openings 3, 4 are formed in the upper and lower halves 8, 9, respectively. These openings 3, 4 are substantially rectangular and centered in the left-to-right direction of the cartridge body 2 for extending from the front side wall 15 towards the vicinity of the center of the cartridge body 2. The central opening 5 is formed only in the lower half 9 at a position in register with the center hub 1b of the magneto-optical disk 1 accommodated in the cartridge body 2. The central opening 5 is substantially circular and is contiguous to the data writing and reading opening 4.

As earlier noted, the disk cartridge of the present embodiment is designed for magneto-optical applications, so that, when the disk cartridge is mounted in an operative position within the recording/reproducing apparatus, the data signal writing and reading opening 3 formed in the upper half 8 is confronted by a magnetic head (not shown) while the data signal recording and reading opening 4 formed in the lower half 8 is confronted by a pickup device (not shown) adapted for irradiating the signal recording surface of the magneto-optical disk 1 with a light beam. In the outer lateral side of the lower half 9, at the front end face of the data signal recording and reading opening 4 formed in the lower half 9, there is formed a recess 19 through which the optical pickup device may intrude into the cartridge body 2 in opposition and in close proximity to the surface of the magneto-optical disk 1.

Figure 3:
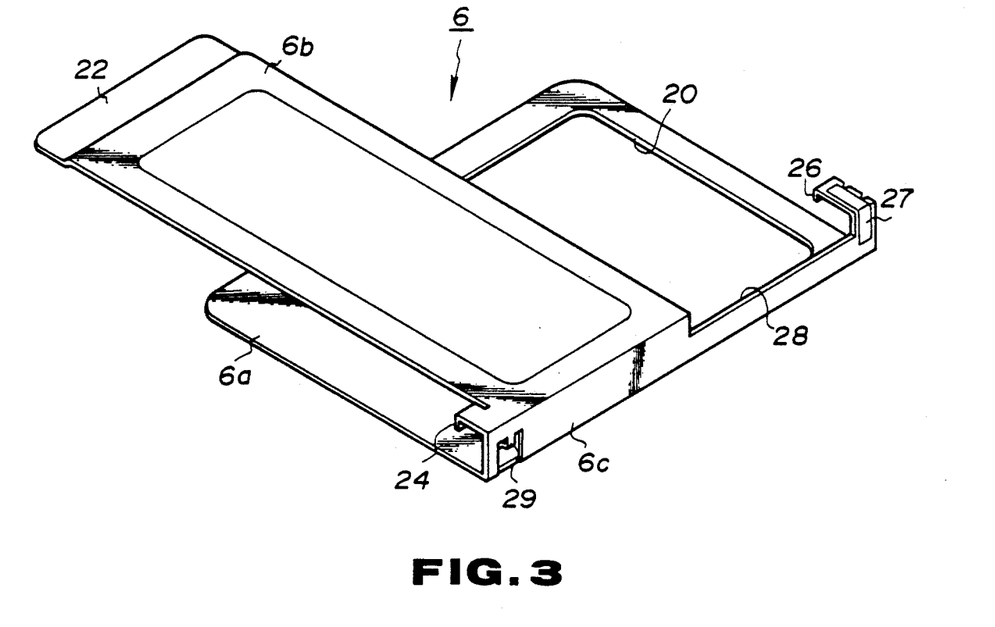
FIG. 3 is an overall perspective view of a shutter to be mounted on the cartridge body.
Figure 4:
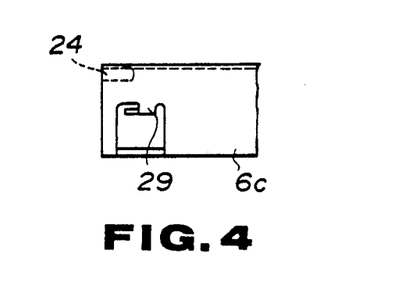
FIG. 4 is a front view showing a spring retainer of the shutter.
Figure 11:
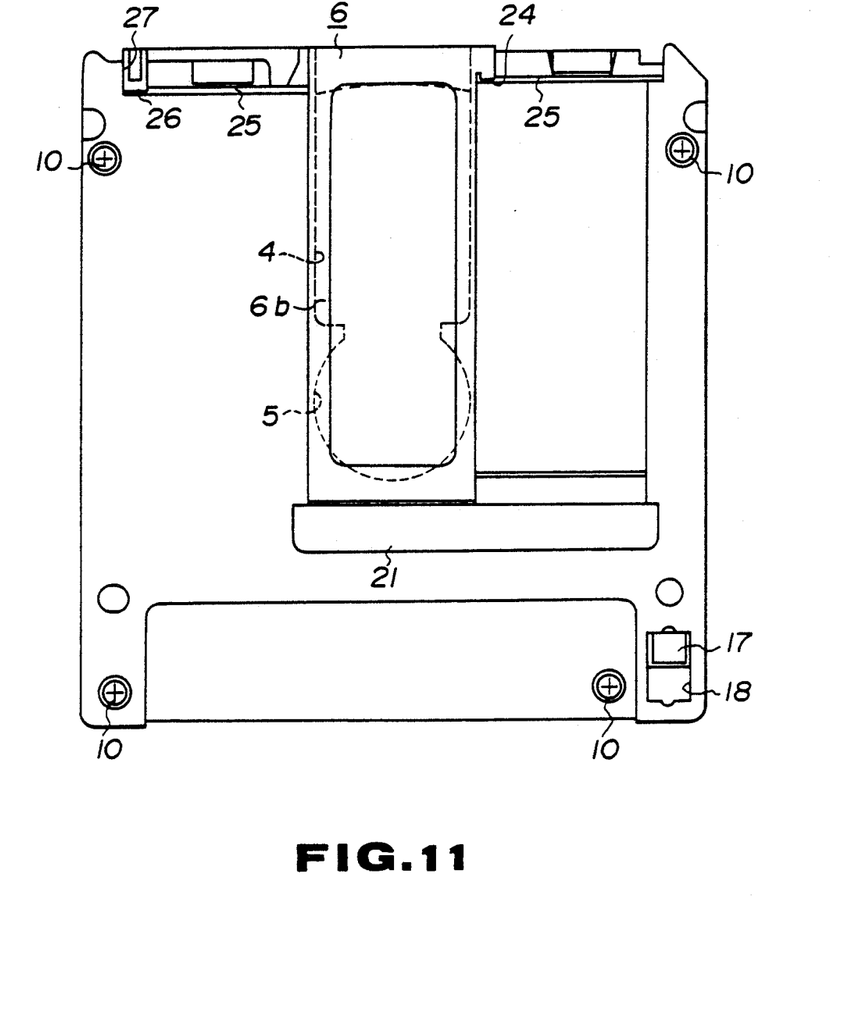
FIG. 11 is a plan view similar to FIG. 10 but looking from below.

The shutter 6 is formed by punching and bending a thin metal plate, such as a thin stainless steel plate, into the cross-sectional shape of a letter U, as shown in FIGS. 3 and 4. This shutter 6 is comprised of a first shutter section 6a for closing the data signal writing reading opening 3 in the upper half 8, a second shutter section 6b for closing both the data signal recording and reading opening 4 and the central opening 5 in the lower half 9 simultaneously, and a connecting section or web 6c interconnecting the first and second shutter sections 6a, 6b. As shown in FIG. 3, the first shutter sections 6a of the shutter 6 is in the from of a transversely wide rectangle and is formed with a rectangular through-hole 20 adapted for exposing the data signal recording and reading opening 3 when the shutter 6 is moved in the direction for opening the openings 3, 33 and 5. As shown in FIG. 4, the second shutter section 6b is in the form of a transversely narrow rectangle for closing the data signal writing and reading opening 4 and the central opening 5 in the lower half 9 simultaneously. The free end portion of the second shutter section 6b is formed with a bent or offset thrust portion 22 which is slidably engaged under and supported by a shutter retaining plate 21 mounted on the outer lateral side of the lower half 9 (FIG. 11) for preventing the second shutter section 6b from floating away from the cartridge body 2. At one lateral side of the second shutter section 6b there is connected to the connecting section or web 6c, a first engaging pawl 24 which engages in or first laterally extended slide guide groove 23 formed in the outer surface of the lower half 9 on attachment of the shutter 6 to the cartridge body 2 (FIG. 11). The end of the connecting web 6c, remote from the second shutter section 6b, is formed with a slide guide section 27 on the end of which is formed a second engaging pawl 26 (FIG. 3) for engaging with a second slide guide groove 25 when the shutter 6 is mounted on the cartridge main body 2 (FIG. 11). The second slide guide groove 25 is provided on the outer lateral side of the lower half 9 in parallel with the first slide guide groove 23. The connecting web 6c interconnecting the first and second shutter sections 6a, 6b is in slidable contact with the front side of the cartridge body 2 to play the role of stably sliding the shutter 6. Thus the connecting web 6c is formed with a width substantially equal to the thickness of the front side of the cartridge body 2. As shown in FIGS. 2 and 3, the connecting web 6c is formed with a recess 28 or cutout which is of substantially the same shape as the recess 19 in the lower half 9 and which is positioned to register with the recess 19 when the shutter 6 is disposed for opening the openings 3, 4 and 5. Similarly to the recess 19, the cutout 28 is adapted to enable the optical pickup device to intrude into the cartridge body in proximity and opposition to the magneto-optical disk 1.

Figure 10:
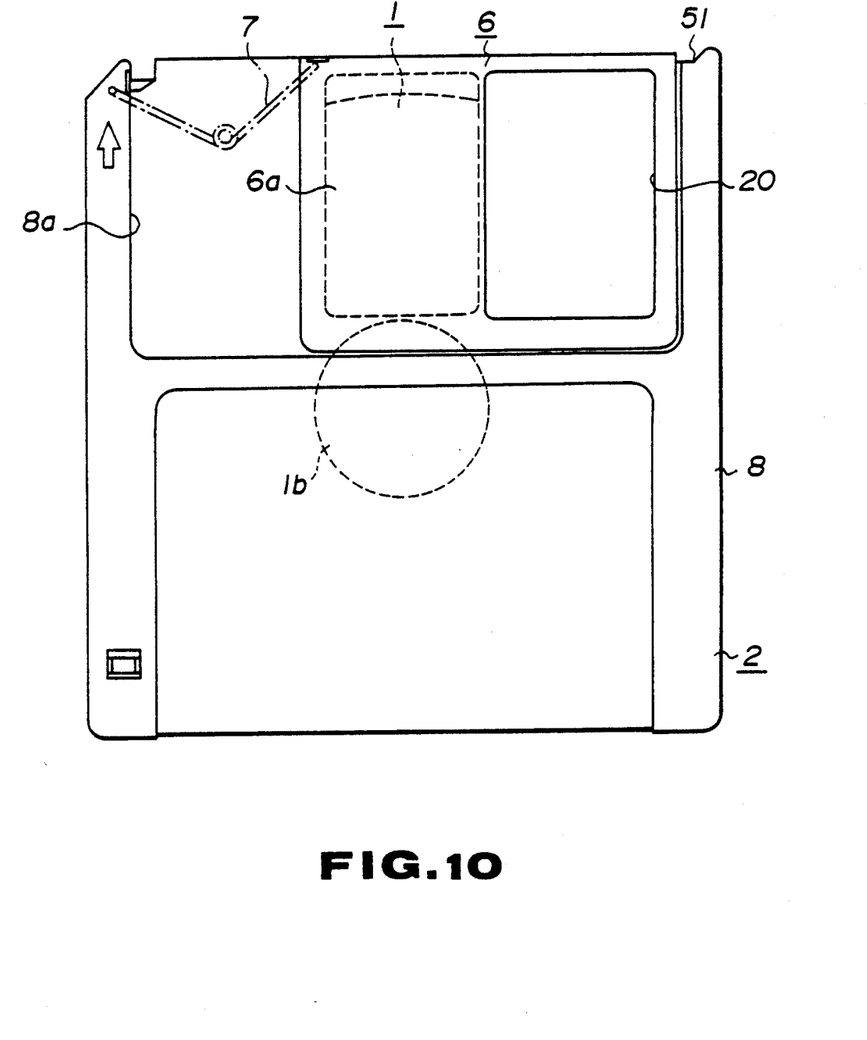
FIG. 10 is a plan view, looking from above, and showing the shutter moved to a position for closing the data signal writing and reading openings and the central opening.

The connecting web 6c is formed with a spring retainer 29 (FIGS. 3 and 4) which is adapted for retaining the torsion coil spring 7 relative to the shutter 6 while the spring 7 is retained within the cartridge main body 2, and acts, in turn, for biasing the shutter 6 mounted on the cartridge body 2 in the direction for closing the data signal writing and reading openings 3, 4 and the central opening 5 as shown in FIGS. 10 and 11. This spring retainer 29 is provided at the side of the connecting web 6c interconnecting the first and second shutter sections 6a, 6b and is bent towards the interior of the shutter 6 so as to run parallel to the first and second shutter sections 6a, 6b. The spring retainer 29 is formed substantially in the form of a letter L, as shown in FIG. 4.

The above described shutter 6 is mounted on the cartridge body 2 by being fitted over the front side of the cartridge main body 2 with the first and second shutter sections 6a, 6b embracing the outer surfaces of the upper and lower halves 8 and 9. At this time, the shutter 6 is mounted to the cartridge body 2 by engagement of the pawls 24 and 26 in the first and second slide guide grooves 23, 25. The shutter 6 thus mounted on the cartridge main body 2 is moved, with the first and second engaging pawls 24, 26 being guided in the first and second slide guide grooves 23, 25, between a position shown in FIGS. 10 and 11 for closing the data signal recording reading openings 3, 4 and the central opening 5 and a position shown in FIGS. 12 and 13 for opening these openings 3, 4 and 5.

The regions of the cartridge body 2 over which the first and second shutter sections 6a, 6b of the shutter 6 are extended and moved are formed as recesses in which the first and second shutter sections 6a, 6b are received flush with the outer lateral sides of the cartridge body 2.

When the shutter 6 is fitted on the cartridge main body 2, the offset face end portion 22 of the first shutter section 6b is slidably engaged under the lower surface of the shutter retaining plate 21. With the offset free end portion 22 being engaged by the shutter retaining plate 21, it becomes possible to prevent the shutter 6 from floating away from the cartridge body 2 and thereby assure a stabilized sliding movement of the shutter 6.

Figure 5A:
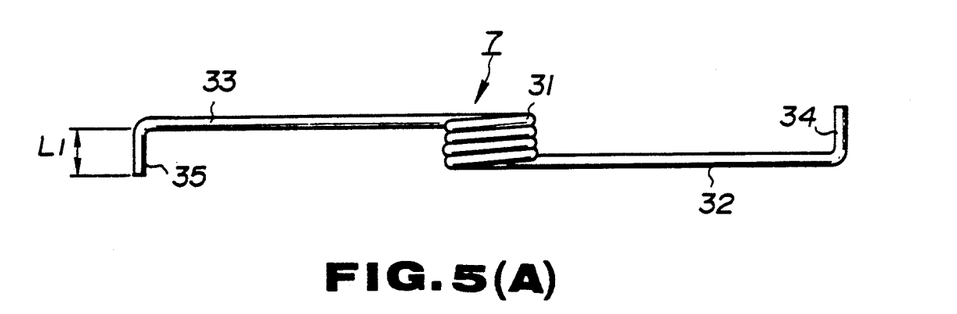
FIG. 5A is a side elevational view of a torsion coil spring.
Figure 5B:
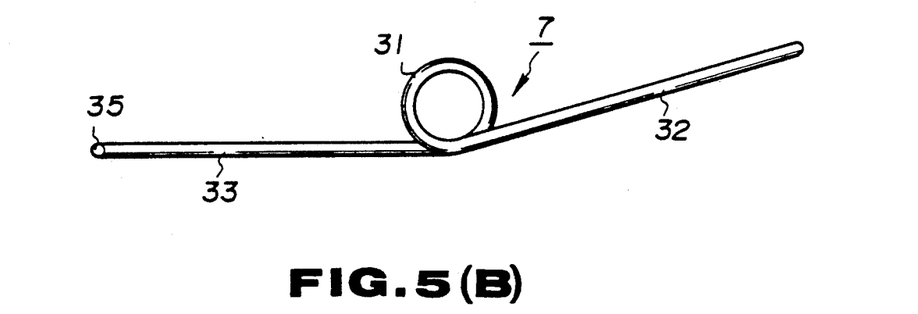
FIG. 5B is a plan view of the torsion coil spring.

The torsion coil spring 7 (FIGS. 5A, 5B and 6) for biasing the shutter 6 is formed with several helical turns in a stainless steel wire for forming a coil section 31 from the ends of which a pair of arm sections 32 and 33 are extended in the tangential direction of the coil section 31. The ends of the arm sections 32, 33 are formed with retaining sections 34, 35 which are bent in opposite directions with a bending angle approximately equal to 90°. This torsion coil spring 7 is inserted into the cartridge main body through a spring insertion opening 36 formed in the front side of the cartridge body 2.

As shown in FIGS. 1, 6, 7A and 8 the spring insertion opening 36 is formed at the front side of the cartridge body 2 on which the shutter 6 is mounted, but at a position where the opening 36 is unobstructed when the shutter 6 is moved to the position for closing the data signal writing and reading openings 3, 4 and the central opening 5.

Figure 7A:
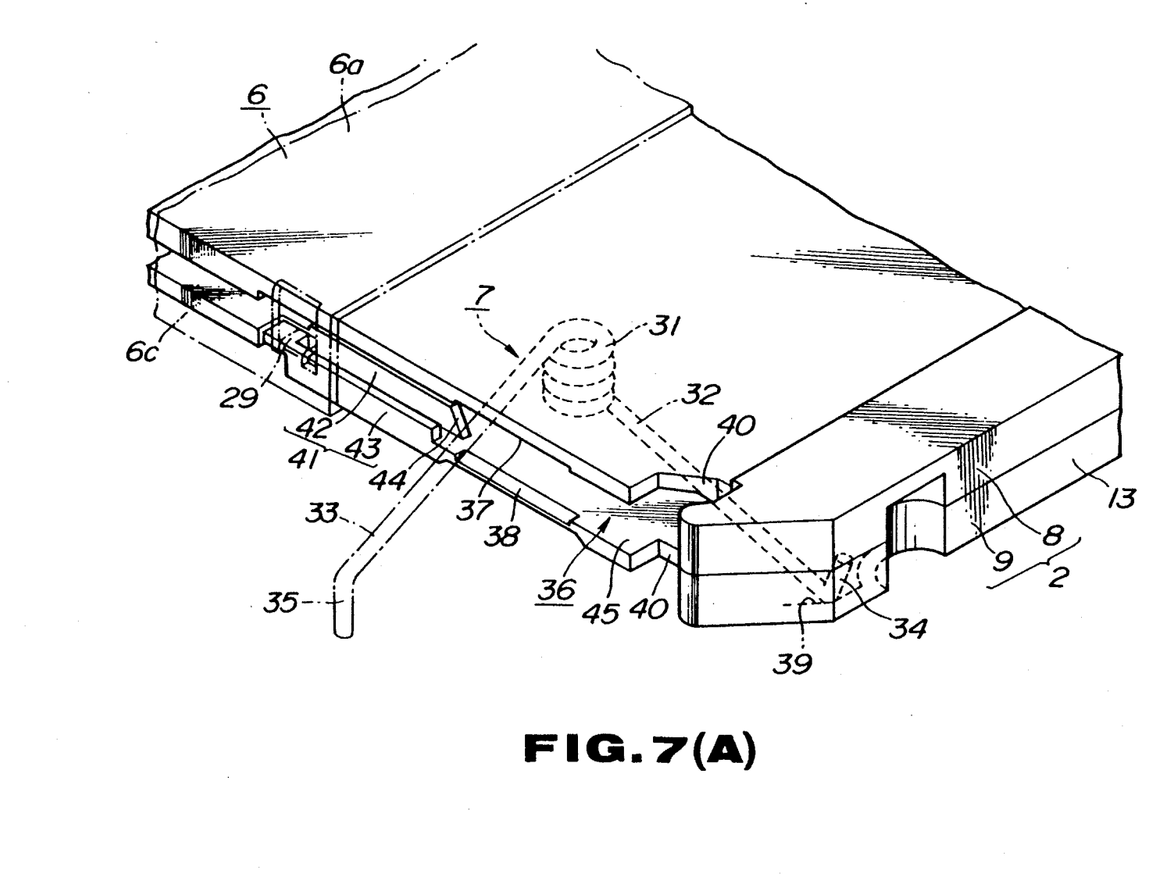
FIGS. 7A and 7B are perspective views showing how the torsion coil spring is inserted into the cartridge body.
Figure 7B:
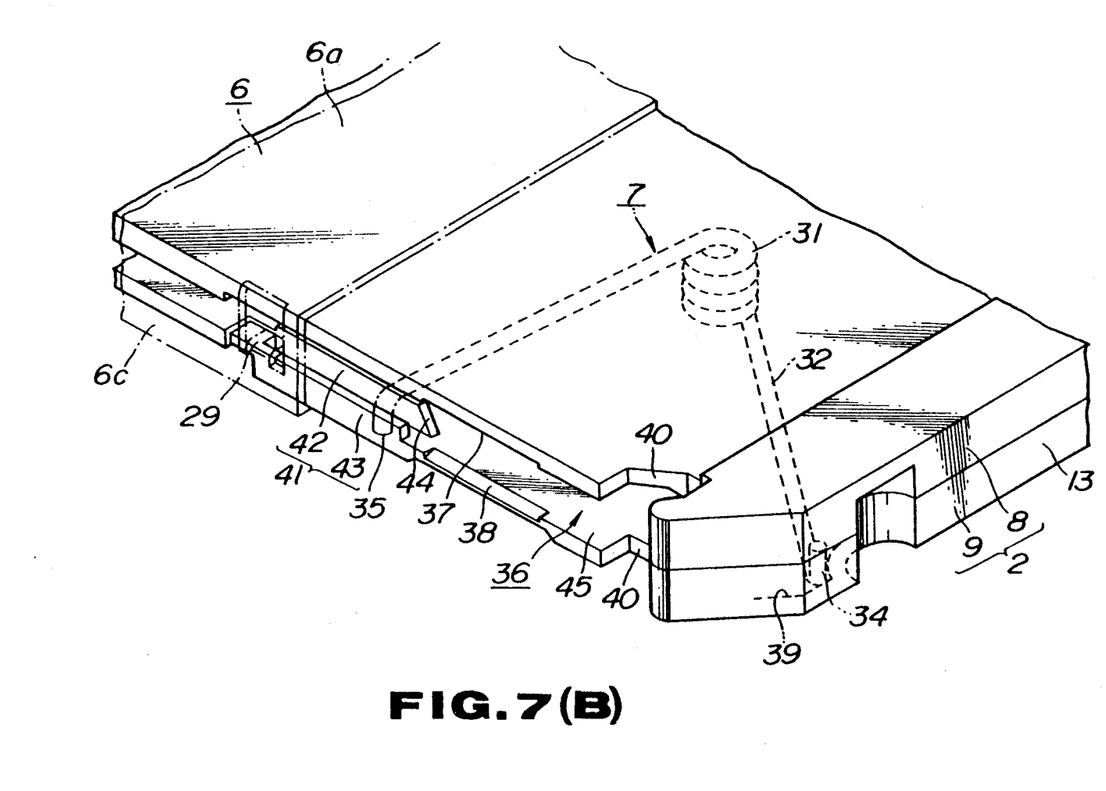
Figures 8, 9:
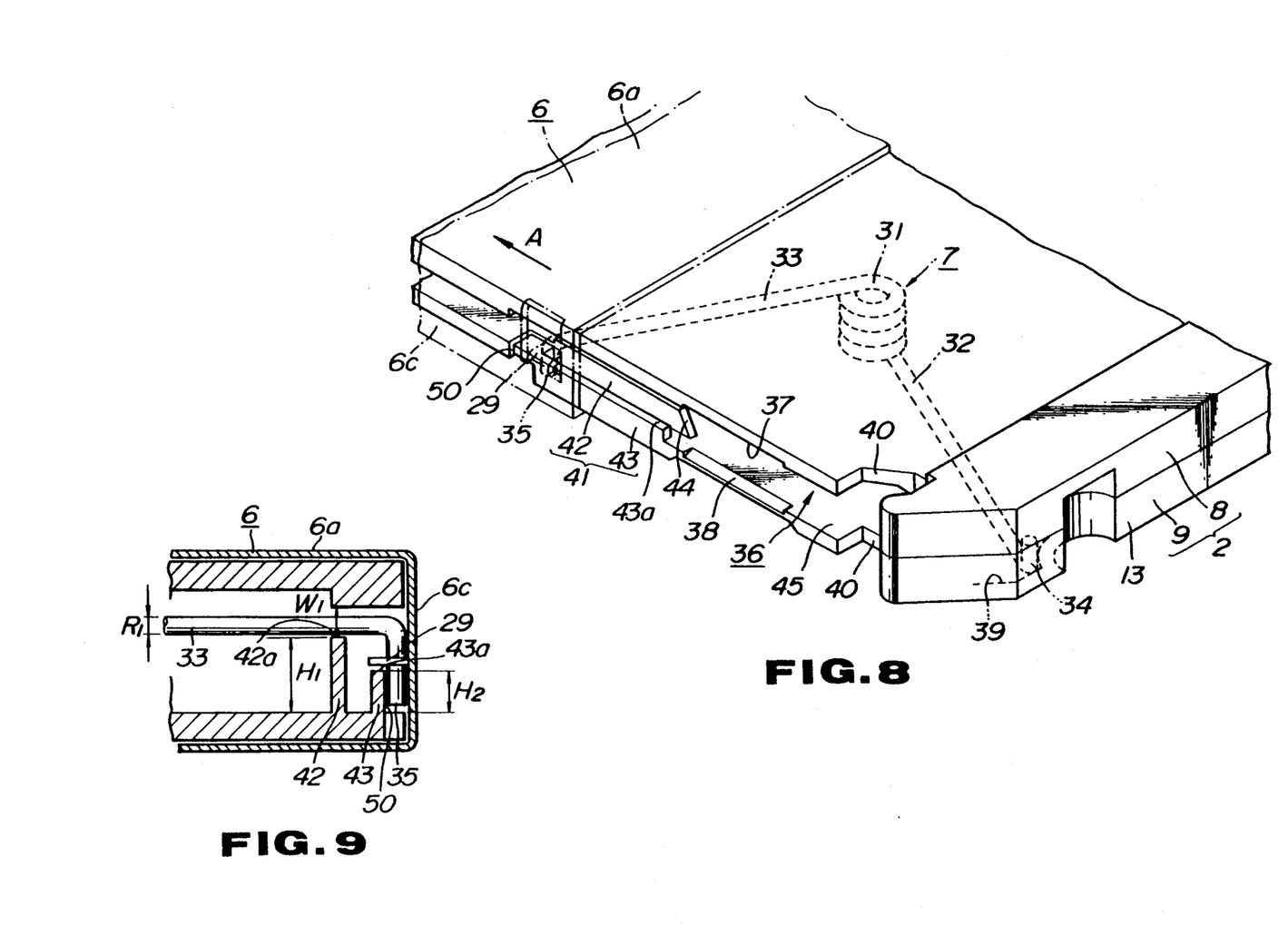
FIG. 8 is a perspective view showing how the torsion coil spring is installed between the shutter and the cartridge body.
FIG. 9 is a cross-sectional view showing how a bent retaining end of an arm section of the torsion coil spring is engaged with the retainer provided in the shutter.

That is, the opening 36 is formed, as shown in FIGS. 1 and 8, towards the side wall 13 of the cartridge body 2 by there partially removing the front wall 15 of the cartridge main body 2. In other words, as shown in FIGS. 1 and 2, the front wall sections 15a, 15b of the upper and lower halves 8 and 9 are interrupted at the spring inserting opening 36. On the confronting inner lateral sides of the opening 36, oppositely inclined or bevelled guide surfaces 37, 28 (FIGS. 6, 7A, 7B and 8) are formed for delimiting the inserting position of the coil section 31 inserted into the cartridge main body 2.

At the side of the opening 36 towards the side wall 13, a relief or cutout section 40 is formed in each of the upper and lower halves 8 and 9 to permit the bent retaining end 34 of the arm section 32 of the torsion coil spring 7 to be inserted into the cartridge body 2 and into engagement with a spring retainer 39 provided in the front side corner of the upper half 8. The spring retainer 39 is formed as an engaging recess in the front side corner of the upper half 8.

At the front side of the cartridge main body 2, there is provided a spring movement controlling section 41 which is contiguous with the spring inserting opening 36, as shown in FIGS. 1 and 8. The controlling section 41 causes the arm section 33 of the torsion coil spring 7 to be resiliently shifted into engagement with the spring retainer 29 of the shutter 6 when the coil spring 7 is introduced into the cartridge body 2. The controlling section 41 is constituted by a height controlling rib 42 for controlling the position, in the direction of the thickness of the cartridge main body 2, of the arm section 33 of the torsion coil spring 7 when introduced into the cartridge body 2 and a horizontal movement controlling rib 43 for controlling the movement of the arm section 33 along the major planar surface of the cartridge body 2. These controlling ribs 42, 43 protrude upwardly from the front side portion of the lower half 9 in parallel, and have each other with a horizontal length extending from near the edge of the data signal writing and reading opening 4 to a mid portion of the spring inserting opening 36.

The height controlling rib 42 has its foremost end 44 projecting beyond the foremost end part of the horizontal movement controlling rib 43 towards the spring inserting opening 36. This projecting portion end 44 of the rib 42 extending towards the spring inserting opening 36 is formed with an inclined guide surface for guiding the resiliently shifted arm section 33 of the torsion coil spring so as to lie on the upper surface of the height controlling rib 42, as on FIG. 9.

The height $H_1$ controlling rib 42 has such a height that the arm section 33 of the torsion coil spring 7 resting on the upper surface 42a of the height controlling rib 42 cannot deviate markedly therefrom in the direction of the thickness of the main cartridge body 2. That is, as shown in FIG. 9, the position controlling rib 42 is formed with a height $H_1$ such that a distance $W_1$ between the top surface 42a of the rib 42 and the inner surface of the upper half 8 is approximately equal to the diameter $R_1$ of the arm section 33 of the torsion coil spring 7.

The horizontal movement controlling rib 43 is formed with a height $H_2$ such that the spring retainer 29 formed integrally with the connecting web 6c of the shutter 6 may be moved along an upper edge surface 43a of the rib 43. In other words, the height $H_2$ is so selected as to permit the spring retainer 29, which is formed at about the center of the connecting web 6c of the shutter 6, to extend towards the inside of the cartridge body 2 immediately above the edge surface 43a of the rib 43. The height controlling rib 42, which is formed at a higher position than the rib 43, is spaced inwardly towards the inner side of the cartridge body 2 from the rib 43 so that the rib 42 is not in the way of the foremost part of the spring retainer 29 which protrudes into the cartridge body 2. The bent retaining end 35 of the arm section 33 of the torsion coil spring 7 has a length $L_1$ (FIG. 5A) such that, when the arm section 33 rests on an upper edge face 42a of the height controlling rib 42, the bent retaining section 35 may be engaged with the outer surface of the horizontal movement controlling rib 43 (FIG. 9).

Along the front side of the lower half 9, which is formed with the horizontal controlling rib 43, there is formed a recess 50 (FIG. 8) to receive and permit movement therealong of the bent retaining and 35 of the torsion coil spring 7.

The manner in which the torsion coil spring 7 is introduced into the cartridge body 2 so as to be installed between the spring retainer 39 in the cartridge body 2 and the spring retainer 29 of the shutter 6, is hereinafter explained.

Figure 6:
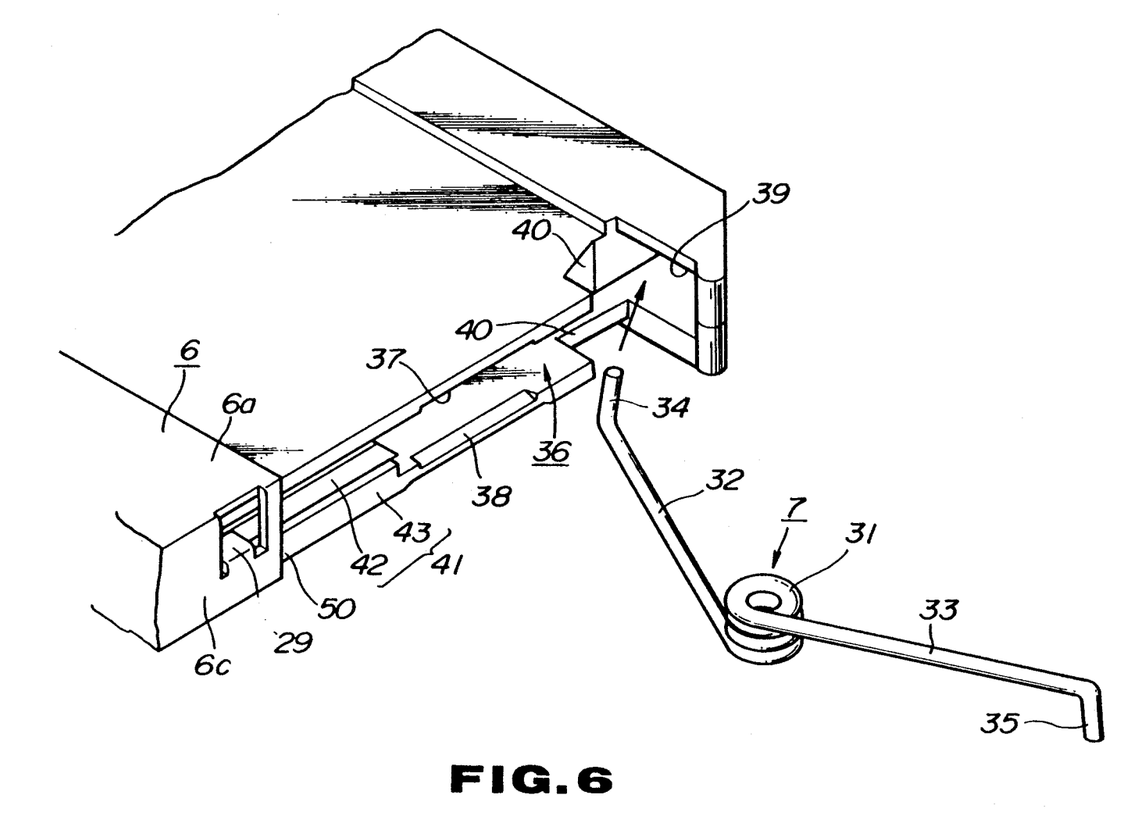
FIG. 6 is a perspective view illustrating how one arm section of the torsion coil spring is engaged with the spring retainer.

For introducing the torsion coil spring 7 into the inside of the cartridge body 2, the bent retaining end 34 of the arm section 32 is positioned in the vicinity of the relief section 40 of the cartridge body 2 (FIG. 6). The bent retaining end 34 is introduced into the cartridge body 2 from the opening end of the spring insertion 36, as the retaining end 34 is twisted, until the end 34 is engaged with the spring retainer 39, as shown in FIG. 7A. The arm section 33 is thrust manually so that the arm sections 32, 33 are resiliently closed on each other.

The coil section 31 of the torsion coil spring 7 is placed in proximity to the inclined guide surfaces 37, 38 of the spring inserting opening 36 and is guided into the inside of the cartridge body 2 by way of these inclined guide surfaces 37, 38. The torsion coil spring 7 in its entirety is progressively introduced into the cartridge body 2. Thus the torsion coil spring 7 is introduced into the cartridge body 2 until the bent retaining end 35 of the arm section 33 confronts the terminal ends of the position controlling rib 42 and the horizontal controlling rib 43 (FIG. 7B). When the thrust manually applied to the arm section 33 is released, the arm section 33 is shifted by the coil section 31 in a direction shown by an arrow A in FIG. 8 under the resiliency of the torsion coil spring 7. At this time, the arm section 33 rides on the upper edge face 42a of the height controlling rib 42 onto which it has been guided by the inclined end guide surface 44 of the height controlling rib 42. The bent retaining end 35 of the arm section 33 engages the front surface of the horizontal movement controlling rib 43, as shown in FIGS. 7B and 9. With the bent engaging end 35 thus engaging with the horizontal movement controlling rib 43, the arm section 33 is prohibited from being resiliently shifted towards the interior of the cartridge body 2 in the horizontal direction of the cartridge body 2 when the torsion coil spring 7 is resiliently restored towards its extended position (FIG. 8). The arm section 33 is progressively shifted in the direction of the arrow A in FIG. 8, as it is prohibited by the horizontal movement controlling rib 43 from being moved towards the interior of the cartridge body 2, until the bent retaining end 35 is engaged with the spring retainer 29 of the shutter 6 mounted on the cartridge body 2, as shown in FIGS. 8 and 9, for biasing the shutter 6 in the direction of the arrow A in FIG. 8. The shutter 6, thus biased by the torsion coil spring 7, is maintained at a position for closing the data signal recording and reading openings 3, 4 and the central opening 5, as shown in FIGS. 10 and 11.

Thus the torsion coil spring 7 is installed between the cartridge member 2 and the shutter 6, with the bent retaining end 34 of the arm section 32 being retained by the spring retainer 39 in the cartridge body 2 and the bent retaining end 35 of the other arm section 33 being retained by the spring retainer 29 of the shutter 6, so that the shutter 6 is biased in the closing direction under the resilient force of the coil section 31 extending the arm sections 32, 33 apart from each other.

Figure 12:
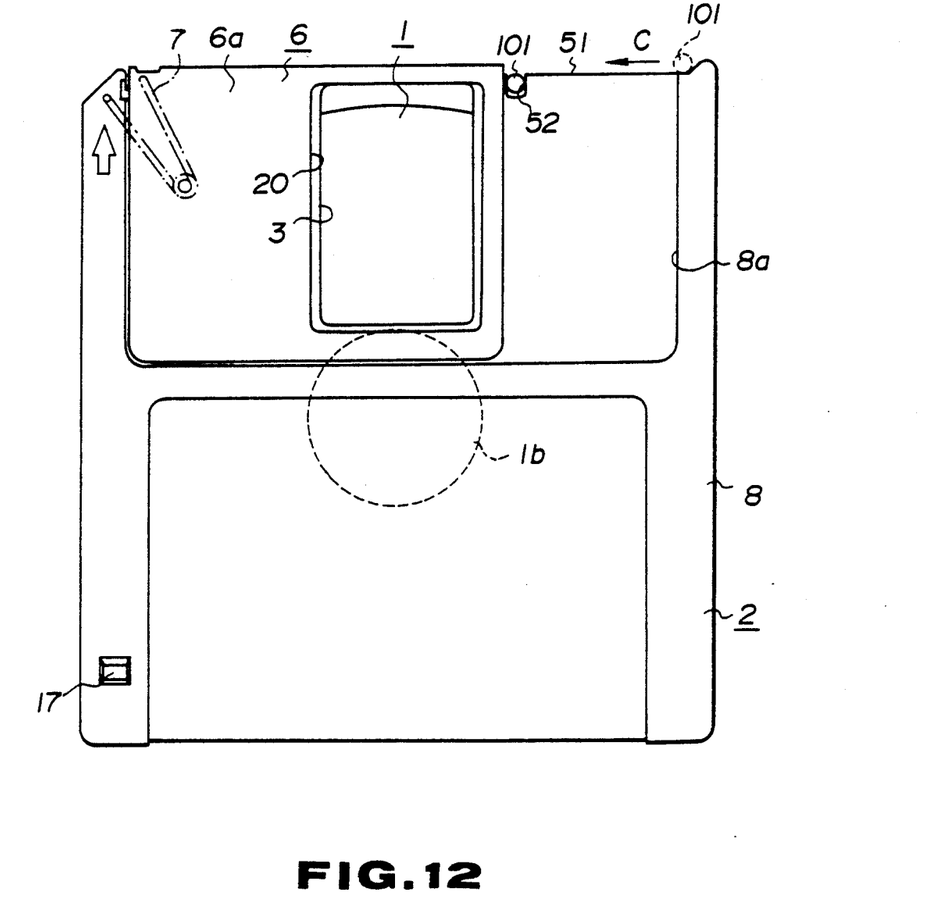
FIG. 12 is a plan view, looking from above, that is, similar to FIG. 10, but showing the shutter moved to a position for opening the data signal writing and reading openings and the central opening.
Figure 13:
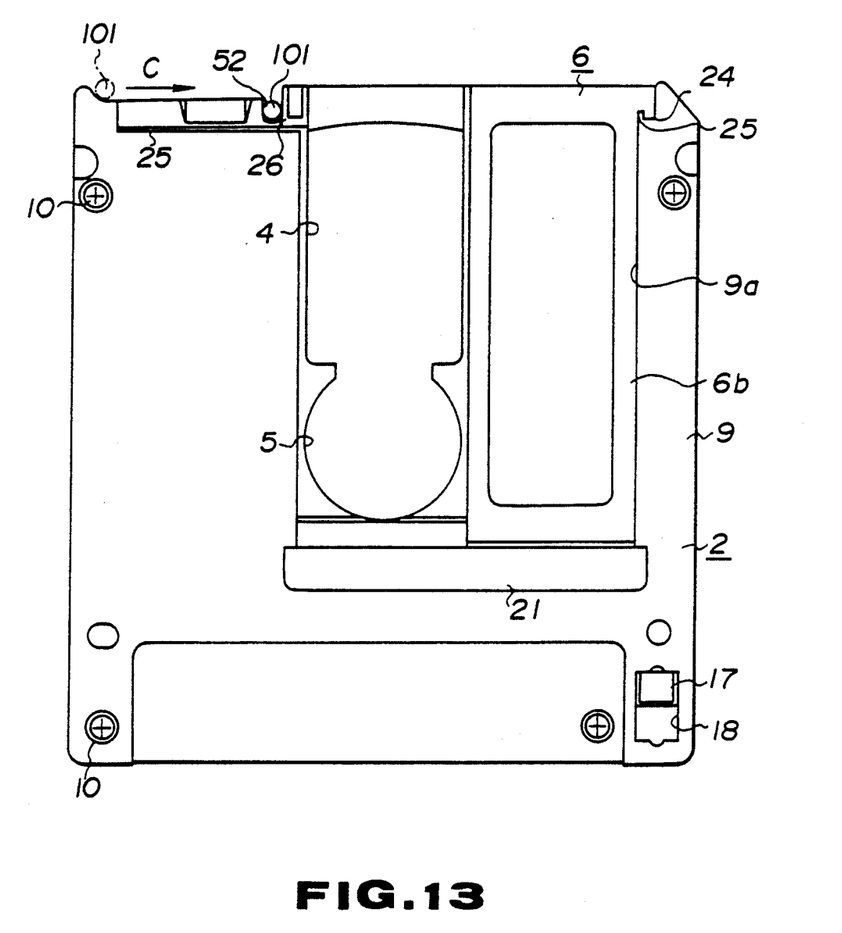
FIG. 13 is a plan view similar to FIG. 12, but looking from below.

It will be noted that, when the disk cartridge is introduced into a recording/reproducing apparatus, the shutter 6 is actuated by a shutter opening and closure unit of the recording/reproducing apparatus for opening the data signal recording and reading openings 3, 4 and the central opening 5 against the bias of the torsion coil spring 7. That is, as the front portion of the disk cartridge is progressively introduced into the recording/reproducing apparatus, a shutter opening and closing pin 101 (FIG. 12) constituting the shutter opening and closing unit of the recording/reproducing apparatus is engaged with the end of a sliding recess 51 for the shutter opening and closing pin 101 which is formed on the front side of the cartridge body 2. As the disk cartridge is further introduced into the inside of the recording/reproducing apparatus, the shutter opening and closing pin 101 is moved relative thereto in the direction shown by an arrow C in FIGS. 12 and 13. The shutter is moved against the bias of the torsion spring 7 by the shutter opening and closing pin 101 for opening the data signal recording reading openings 3, 4 and the central opening 5 as shown in FIGS. 12 and 13. After shifting the shutter 6 to its open position, the pin 101 snaps into an engaging recess 52 formed on the front side of the cartridge main body 2 to maintain the shutter 6 in the above mentioned open position.

Although the present invention is applied in the above embodiment to a disk cartridge accommodating a magneto-optical disk, it is to be noted that the present invention may be broadly applied to any other disk cartridge adapted to bias a shutter with the aid of a torsion coil spring.

With the disk cartridge embodying the present invention, after the torsion coil spring has had its arm sections resiliently thrust in the direction toward each other for insertion through the opening provided in the cartridge body, the arm section to be operatively associated with the shutter is released, so as to be shifted in the direction of positively engaging with the spring retainer of the shutter at the same time that the movement of the released arm section in the horizontal direction and in the direction of the thickness of the cartridge body are controlled in the above described manner.

With an arm section of the torsion coil spring thus made to engage the shutter, the shutter is biased by the torsion coil spring to close the openings of the cartridge body which are adapted for exposing to the outside the signal recording area of the disk-shaped recording medium.

As described hereinabove, it becomes possible with the disk cartridge embodying the present invention to control the direction of movement of the arm sections of the torsion coil spring produced by the resilient restoring force of the torsion coil spring to permit an arm section to be engaged positively with the retainer of the shutter. In addition, the torsion coil spring can be mounted reliably either by manual operation or with the aid of an automatic assembly system.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope of the invention as defined in the appended claims.

What is claimed is:

1. In a disk cartridge which includes a cartridge body, a record disk rotatable in said cartridge body and having a signal recording area and a central chucking area, openings in the cartridge body through which said signal recording area and chucking area of said record disk may be exposed, a shutter slidably mounted on said cartridge body for movement across a front of the latter between opened and closed positions in which said openings in the cartridge body are uncovered and covered, respectively, and a torsion spring of resilient wire shaped to form a coil from which angularly movable first and second arms extend to bent ends acting against the cartridge body and the shutter, respectively, for biasing the shutter to said closed position; said cartridge body includes means defining a first spring retainer in a corner at the front of said body, a slot-like opening extending along said front of the body from said corner and through which said bent end of the first spring arm is engageable with said first spring retainer in the body, said slot-like opening including a relatively wide portion adjacent said corner and through which said torsion spring is bodily insertable into said body with said spring arms flexed toward each other after engagement of said bent end with said first spring retainer, a second spring retainer extending from said shutter into said slot-like opening, an outer rib extending along said slot-like opening from said relatively wide portion thereof and reaching substantially to a path of movement of said second spring retainer with said shutter and presenting an outer face directed forwardly, and an inner rib extending parallel to said outer rib and spaced inwardly therefrom to clear said second spring retainer and having an edge surface higher than said outer rib for narrowing the respective portion of the slot-like opening to a dimension only slightly greater than the diameter of said resilient wire, so that, when said spring arms are released after the bodily insertion of the torsion spring into the cartridge body, said spring arms move resiliently apart for causing said bent end of the second spring arm to move slidably along said outer face and into secure engagement with said second spring retainer while said second spring arm moves through the narrowed portion of said slot-like opening for preventing disengagement of the bent end of said second spring arm from said outer face of the outer rib.

2. A disk cartridge according to claim 1; in which said relatively wide portion of the slot-like opening has bevelled edges extending therealong for facilitating the insertion of said coil of the torsion spring therein.

3. A disk cartridge according to claim 1; in which said cartridge body is comprised of upper and lower halves having respective upper and lower panels with mating peripheral flanges at their side and back edges which abut to form side and back walls of the cartridge body, the front edge of said lower panel is undercut relative to the front edge of said upper panel at least along the extent of said outer rib, and said outer and inner ribs are directed upwardly from said lower panel with said outer rib having said outer face flush with said undercut front edge of said lower panel; and in which said shutter includes parallel spaced-apart shutter sections embracing said cartridge body therebetween and a connecting web extending between said shutter sections and spanning said front of the cartridge body, said connecting web having a finger struck therefrom to define said second spring retainer, and said bent end of the second spring arm being received between said connecting web and said outer face of the outer rib and said undercut front edge of the lower panel.

4. A disk cartridge according to claim 3; in which said inner rib has an inclined edge at the end thereof adjacent said relatively wide portion of the slot-like opening for directing said second spring arm onto said edge surface of the inner rib.

5. A disk cartridge according to claim 4; in which said upper and lower panels have bevelled front edges extending along at least said relatively wide portion of the slot-like opening for facilitating the insertion of said coil of the torsion spring therethrough.

* * * * *